US006637665B2

(12) United States Patent
Salzgeber

(10) Patent No.: US 6,637,665 B2
(45) Date of Patent: Oct. 28, 2003

(54) CARRIER ELEMENT FOR AN ANTENNA

(75) Inventor: Gerard Salzgeber, Zurich (CH)

(73) Assignee: Siemens Schweiz AG, Zürich ( * ) Notice: Subject to any disclaimer, the term of this patent is extended or adjusted under 35 U.S.C. 154(b) by 0 days.

(21) Appl. No.: 10/292,764

(22) Filed: Nov. 13, 2002

(65) Prior Publication Data

US 2003/0057288 A1 Mar. 27, 2003

Related U.S. Application Data

(63) Continuation of application No. PCT/EP01/00097, filed on Jan. 8, 2001.

(30) Foreign Application Priority Data

May 15, 2000 (EP) .......................................... 00110358

(51) Int. Cl.[7] .............................................. G06K 19/06

(52) U.S. Cl. ....................... 235/492; 343/895; 343/873; 343/841; 235/486; 235/488

(58) Field of Search ................................ 343/895, 873, 343/841; 235/492, 486, 488

(56) References Cited

U.S. PATENT DOCUMENTS 3,902,177 A 8/1975 Mori et al.
4,251,808 A * 2/1981 Lichtblau ................. 340/572.7
4,373,163 A * 2/1983 Vandebult .................... 343/842
4,751,516 A * 6/1988 Lichtblau ..................... 343/742
5,248,989 A * 9/1993 Murdoch ..................... 343/841
5,442,334 A * 8/1995 Gallo et al. .............. 340/572.3
5,768,217 A * 6/1998 Sonoda et al. ................ 368/10
5,844,244 A 12/1998 Graf et al.
6,018,298 A * 1/2000 Endo et al. .............. 340/572.5
6,295,031 B1 * 9/2001 Wallace et al. ............. 343/702

FOREIGN PATENT DOCUMENTS

WO WO 98/26370 6/1998

* cited by examiner

*Primary Examiner*—Michael G. Lee
*Assistant Examiner*—Kim Nguyen
(74) *Attorney, Agent, or Firm*—Jacob Eisenberg

(57) ABSTRACT

The invention relates to a multi-layered carrier element for reducing interference with an antenna comprising at least one coil. In addition to the layer, the antenna comprises a shield which is placed along at least one extension of the antenna and split at a certain point. The shield is electrically connected to a reference point which is located on the carrier element and is preferably electrically connected to the ground layer. The shield reduces interference such as that caused by a hand or by a nearby metallic object.

15 Claims, 1 Drawing Sheet

CARRIER ELEMENT FOR AN ANTENNA

CROSS-REFERENCE TO RELATED APPLICATIONS

The present application is a continuation of international application PCT7EP01/00097, which designated the United States, was filed on Jan. 8, 2001, and is incorporated herein by reference; and claims priority to European Patent Application 00110358.9, was filed May 15, 2000, and is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

The present invention relates to the general field of antenna carriers and more particularly to a structure for housing and carrying an antenna with reduced sensitivity to external interferences, especially from the human hand. The structure may be a portable receiver such as a smart card or chip card.

U.S. Pat. No. 5,844,244 sets out an example of a portable receiver. Such receivers are often referred to as electronic tickets. A second example is set out in WO 98/26370. Herein, a wireless communication system with portable receivers is described wherein the data transfer occurs via a magnetic H-field. Frequencies of 6.78 Mz or 27 MHz are typically effective. If transmitters of the above mentioned frequency are placed within the entrance area of a door, the transmitted electromagnetic field in the entrance area is developed as a near-field. The expression near-field means that the so-called H-portion dominates. The section of the near-field is generally defied by the character r for which the relationship $r<0.6\cdot\lambda$ applied. λ refers to wavelength. For λ=22 m, at a frequency of for example 13.5 MHz, the near-field conditions are fulfilled at up to a distance of approximately 12 m.

The transmission via frequencies at above the mentioned examples would require large antennas with dimensions of several meters. However, the maximum size of the antenna is given or limited by the size of the device or carrier element. The receiver antenna has to be reduced for example to the dimensions of a chip card for contactless detection systems. Such chip cards generally have measurements approximate to a standard credit card which is $53\times85$ $mm^2$. Such a high reduction of the antenna size leads to a very low antenna reciever voltage on the one hand and to an increased sensitivity of the antenna voltage to the surroundings on the other. The low sensitivity can be mostly compensated for by an appropriate pre-stage amplification. However, with chip cards it is to be noted that the power consumption of such pre-stages has to be as low as possible. Furthermore, the antenna voltage is reversed proportional to the third power of the ratio of the receiver antenna distance—transmitter antenna in the near-field section. The number of turns of such antennas is very limited due to space limitations.

Additionally, there is the problem with portable receivers, that the reception is disturbed by, for example, the human hand or other electrically conducting bodies located nearby.

The interference can cause, for example, a severely reduced antenna voltage or a detuning of the antenna. A changing of the provided frequency of resonance is described by detuning. Because changes may result from received power with transmitted information, a particularly reliable transmission is required.

BRIEF SUMMARY OF THE INVENTION

An advantage of the present invention is a carrier element for an antenna with reduced sensitivity to interfering influences from its' surroundings. These and other advantages are effected by an apparatus comprising: at least one antenna winding, said winding running in a layer of said element, at least one shield divided into parts by at least one partition, said shield running above and parallel to said layer, said parts being electrically insulated from one another. In the apparatus said at least one shield comprises at least a second shield, said second shield being divided in second parts by at least one second partition, said second parts being electrically insulated from one another. The apparatus may further comprise a third shield disposed atop said first shield and second shield, said third shield including at least one third partition dividing said third shield into third parts, said third parts being electrically insulated from one another.

BRIEF DESCRIPTION OF THE SEVERAL VIEWS OF THE DRAWINGS

The novel features and method steps believed characteristic of the invention are set out in the claims below. The invention itself however, as well as other features and advantages thereof, are best understood by reference to the detailed description, which follows, when read in conjunction with the accompanying drawing, wherein:

DETAILED DESCRIPTION OF THE INVENTION

Figure 1A:
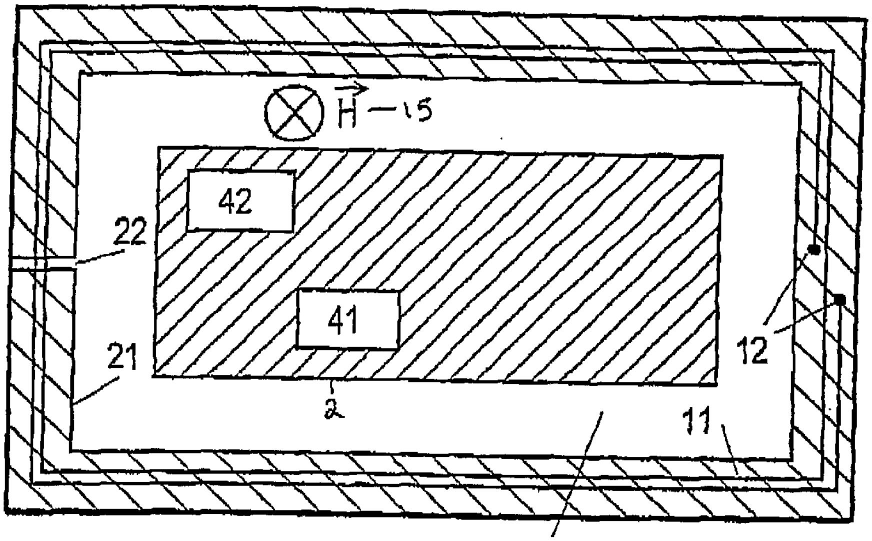
FIG. 1*a* depicts a first view of an apparatus according to the present invention.

FIG. 1*a* depicts a chip card as a carrier element 5. The carrier element 5 comprises multiple layers. The rectangle 2 depicts a ground layer. In alternative embodiments, the ground layer is not planar. Components 41 and 42 are indicated as a suggestion on the carrier element 5 in a discrete or integrated application. A frame antenna 11 (antenna) is placed with several windings along the circumference of the carrier element 5, the bonding occurs via the connections 12. The further connections on the multilayered carrier element 5 are omitted for clarity and only two of the seven windings are disclosed. Shield 21 is depicted with shaded lines or cross hatching in FIG. 1*a*, which surround the windings of the antenna 11 from below and above. Physically, the windings of the antenna 11 are not normally visible. The number of windings of the antenna 11 is determined by the geometry of the carrier element 5 as well as by the execution of the pre-stage and amplification required for the amplification of the antenna voltage. Antenna 11 is placed in and runs along a layer of the multilayered carrier element.

To diminish the influence of electrically conducting materials on the antenna 11, electrical shields 21 are provided. The shield 21 and in particular parts $\mathbf{21}_1$ and $\mathbf{21}_2$ are each connected to a reference point or ground 3 and placed above and below the antenna windings (FIG. 1*b*) thereby deterring impacting influences from the surroundings, e.g. parasitics. Such a coupling operates as an antenna extension and can increase antenna voltage. The resulting detuning of antenna 11 is undesired and therefore eliminated by shield 21 and in particular parts $\mathbf{21}_1$ and $\mathbf{21}_2$.

The antenna 11 is tuned to the receiver frequency; this tuning may be carried out with a parallel connected capacitor (not disclosed in the figures). The antenna can also be coupled aperiodically if a wider bandwidth is desired.

The size of shields $\mathbf{21}_1$ and $\mathbf{21}_2$ is approximately 0.6 to 1 mm. The space can also be greater than 1 mm in alternative embodiments. The shields $\mathbf{21}_1$ and $\mathbf{21}_2$ are partitioned at location 22 so to avoid a cyclic current which would otherwise unacceptably dampen the magnetic field. The partition 22 is arranged, as depicted in FIG. 1*a*, in accordance with connections 12 of the antenna 11.

Epoxy FR4 may be used for the carrier material. Additional layers typically required for a chip card include the ground layer, L1, L2, etc. with the strip conductors for the electronic components, all of which are not disclosed in FIG. 1*b*.

Figure 1B:
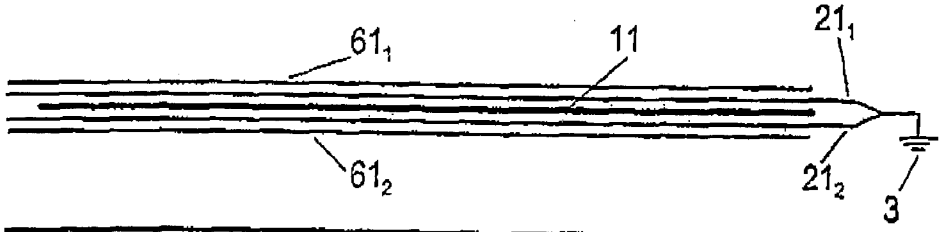
FIG. 1*b* depicts a sectional view of the apparatus.

In another embodiment, two additional, unconnected, electrical conducting shields $\mathbf{61}_1$ and $\mathbf{61}_2$ may be disposed. The formation of the shields $\mathbf{61}_1$ and $\mathbf{61}_2$ is shown in FIG. 1*b*. The effect of the additional shields $\mathbf{61}_1$ and $\mathbf{61}_2$ is to more evenly distribute the e-field about shields $\mathbf{21}_1$ and $\mathbf{21}_2$. The influence of the human hand may further be reduced by the additional shields. The application of these additional shields $\mathbf{61}_1$ and $\mathbf{61}_2$ is to be carried out in such a way that they may each be arranged in a spacing of about 0.2 mm from the shield $\mathbf{21}_1$ and $\mathbf{21}_2$. In FIG. 1*a*, element 15 indicates the direction of the magnetic field, which as depicted, runs out from the paper towards the viewer.

Figure 2:
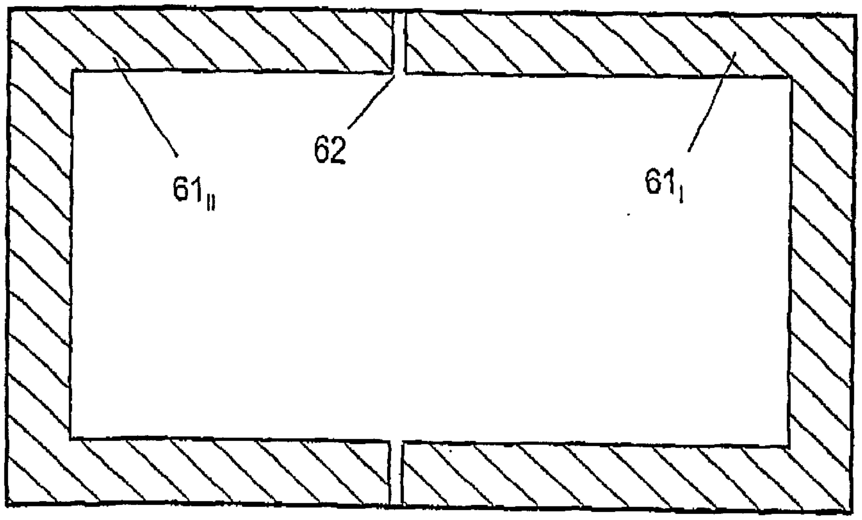
FIG. 2 depicts a feature of the apparatus.

A particular formation of the arrangement and partition of the additional shield 61 is shown in FIG. 2. Such shields should be applied as symmetrically as possible, for example via segments $\mathbf{61}_I$ and $\mathbf{61}_{II}$. In alternative embodiments, the additional shields may be further partitioned into four parts, the partitions being symmetrical about a center point. The partitions may further be opposite one another and located at a mid point or about the corners of the additional shields (now broken down into four parts). The now broken down shields may further be grounded with the ground connection location on the shields being application specific.

It is particularly advantageous, if the locations 62, where the shields $\mathbf{61}_I$ and $\mathbf{61}_{II}$ are partitioned are shifted opposite to the location of the partition 22 (not disclosed in FIG. 2).

All shields 21 and 61 comprise a thin copper foil and in particular may be applied as and/or comprise strip conductors having widths greater than the width of the antenna windings. The antenna windings may also be executed as strip conductors in this embodiment.

The antenna voltage changes only by a few percents when approached with the hand. The antenna factor, which is defined as a quotient antenna voltage partitioned by H-Field, is typically 10 Vm/A.

Therefore, the following antenna voltage can be expected for a frequency of 6.78 MHz at 1 W transmitting power in the spacing of approximately 1.5 m at a carrier element 5 with seven antenna windings: 1 mV. The antenna voltage would be reduced to approximately 50 $\mu$V in a greater spacing than approximately 4 m.

The hand sensitivity can be further reduced depending upon the used frequency by installation of additional shielding layers.

The execution of the carrier element according to the invention is not limited to frame-shaped antennas. Topological equivalent forms are also possible according to their range of application; the present invention can be particularly executed for circular antennas too.

In another embodiment, it may be sufficient to install the shield 21 one-sided only.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A carrier element for an antenna, comprising:

at least one antenna winding, said winding running in a layer of said element, at least one shield divided into parts by at least one partition, said shield running above and parallel to said layer, said parts being electrically insulated from one another, a second shield divided into second parts by at least one second partition, said second parts being electrically insulated from one another; and a third shield disposed atop said first shield and second shield, said third shield including at least one third partition dividing said third shield into third parts, said third parts being electrically insulated from one another.

2. The carrier element according to claim 1, wherein said at least one partition comprises two partitions thereby creating two third parts, said two third parts being arranged symmetrically about a perimeter of said element.

3. The carrier element according to claim 1, wherein said at least one partition comprises four partitions thereby creating four third parts, said four third parts being arranged symmetrically about a perimeter of said element.

4. The carrier element according to claim 1, wherein at least one of said parts is grounded.

5. The carrier element according to claim 1, wherein at least one of said second parts is grounded.

6. The carrier element according to claim 1, wherein at least one of said third parts is grounded.

7. The carrier element according to claim 1, wherein said parts are arranged symmetrically about a perimeter of said element.

8. The carrier element according to claim 1, wherein said second parts are arranged symmetrically about a perimeter of said element.

9. The carrier element according to claim 4, wherein said ground is a ground layer of said element.

10. The carrier element according to claim 5, wherein said ground is a ground layer of said element.

11. The carrier element according to claim 6, wherein said ground is a ground layer of said element.

12. The carrier element according to claim 1, wherein said antenna comprises a strip conductor.

13. The carrier element according to claim 1, wherein said shield comprises a strip conductor.

14. The carrier element according to claim 1, wherein said second shield comprises a strip conductor.

15. The carrier element according to claim 1, wherein said third shield comprises a strip conductor.

* * * * *